United States Patent
Lorenz et al.

(10) Patent No.: US 10,131,743 B2
(45) Date of Patent: Nov. 20, 2018

(54) METHOD FOR WORKING UP ALKALINE POLYETHER POLYOLS

(71) Applicant: Covestro Deutschland AG, Leverkusen (DE)

(72) Inventors: Klaus Lorenz, Dormagen (DE); Marco Antonio Marquez-Benitez, Atizapan de Zaragoza (MX)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/110,050

(22) PCT Filed: Dec. 16, 2014

(86) PCT No.: PCT/EP2014/077949
§ 371 (c)(1),
(2) Date: Jul. 6, 2016

(87) PCT Pub. No.: WO2015/091471
PCT Pub. Date: Jun. 25, 2015

(65) Prior Publication Data
US 2016/0369051 A1 Dec. 22, 2016

(30) Foreign Application Priority Data
Dec. 18, 2013 (EP) .................................. 13198081

(51) Int. Cl.
*C08G 65/30* (2006.01)
*C08G 65/10* (2006.01)

(52) U.S. Cl.
CPC ............ *C08G 65/30* (2013.01); *C08G 65/10* (2013.01)

(58) Field of Classification Search
None
See application file for complete search history.

(56) References Cited

U.S. PATENT DOCUMENTS

| | | | |
|---|---|---|---|
| 4,647,595 A | 3/1987 | Kozawa et al. | |
| 5,470,813 A | 11/1995 | Le-Khac | |
| 5,536,833 A | 7/1996 | Le-Khac | |
| 5,637,673 A | 6/1997 | Le-Khac | |
| 5,714,428 A | 2/1998 | Le-Khac | |
| 5,789,626 A | 8/1998 | Le-Khac | |
| 6,018,017 A | 1/2000 | Le-Khac | |
| 6,504,062 B2 | 1/2003 | Brons et al. | |
| 6,710,096 B2 | 3/2004 | Neff et al. | |
| 7,008,900 B1 | 3/2006 | Hofmann et al. | |
| 8,017,814 B2 | 9/2011 | Hasselaar et al. | |
| 9,012,695 B2 | 4/2015 | De Mars et al. | |
| 2005/0215831 A1* | 9/2005 | Zieler | C08G 65/30 568/679 |
| 2012/0078018 A1* | 3/2012 | De Mars | C08G 65/30 568/619 |

FOREIGN PATENT DOCUMENTS

| | | | | |
|---|---|---|---|---|
| DE | 10250429 A1 | | 5/2004 | |
| GB | 1108013 | | 3/1968 | |
| WO | WO 99/47582 | * | 9/1999 | ............. C08G 65/30 |
| WO | WO 01/88015 | * | 11/2001 | ............. C08G 65/30 |

OTHER PUBLICATIONS

Ionescu, M. et al; Advances in Urethane Science & Technology; "New Synthetic Pathways to Polyether Polyols for Rigid Polyurethane Foams"; vol. 14; pp. 151-218; (1998); Bucharest, Romania; The British Library, On Demand, Boston Spa, Wetherby, United Kingdom.

De Lucas, A. et al; Organic Process Research & Development; An Improved Method for the Purification of Polyether-Polyols Using Phosphoric Acid as Neutralization Agent; vol. 3; No. 3; pp. 166-171; American Chemical Society and Royal Society of Chemistry (1999); Ciudad Real, Spain.

Middleton, John C. et al; Ullmann's Encyclopedia of Industrial Chemistry; "Stirred-Tank and Loop Reactors"; vol. B4; pp. 167-180; (1992) VCH Publishers, Inc.; United Kingdom.

Hess, W.F. et al; Handbuch Apparate [Apparatus Handbook]; Vulkan-Verlag Essen, 1st ed.; (1990); pp. 188-208; Germany.

* cited by examiner

*Primary Examiner* — Rosalynd A Keys
(74) *Attorney, Agent, or Firm* — N. Denise Brown

(57) ABSTRACT

This invention relates to a process for preparing polyols which contain oxyalkylene units. This process comprises neutralizing a crude polyol by addition of an acid, optionally removing water, and removing the salts formed by neutralization. The crude polyol is contacted with the acid for at least 5 minutes.

14 Claims, No Drawings

METHOD FOR WORKING UP ALKALINE POLYETHER POLYOLS

CROSS-REFERENCE TO RELATED APPLICATIONS

This application is a National Phase application of PCT/EP2014/077949, filed Dec. 16, 2014 and European Application No.: 13198081.5 filed Dec. 18, 2013, each of which being incorporated herein by reference.

FIELD

The present invention relates to a simple process for preparing polyols by base-Catalyzed addition of alkylene oxides (epoxides) and optionally further comonomers onto starter compounds having Zerewitinoff-active hydrogen atoms, and to a process for workup of alkaline crude polyols.

BACKGROUND

Polyols suitable for production of polyurethane materials such as flexible or rigid foams or solid materials such as elastomers are generally obtained by polymerization of suitable alkylene oxides onto polyfunctional starter compounds, i.e. those containing a plurality of Zerewitinoff-active hydrogen atoms. For the performance of these polymerization reactions, a wide variety of different processes have been known for some time, some of which are complementary to one another:

A first method of industrial significance is the base-catalyzed addition of alkylene oxides onto starter compounds having Zerewitinoff-active hydrogen atoms, and another is the frequent use of double metal cyanide compounds ("DMC catalysts") for the performance of this reaction. With the use of highly active DMC catalysts described, for example, in U.S. Pat. No. 5,470,813, EP-A 700 949, EP-A 743 093, EP-A 761 708, WO 97/40086, WO 98/16310 and WO 00/47649, polyether polyol preparation is possible at very low catalyst concentrations (25 ppm or less), and so it is no longer necessary to remove the catalyst from the finished product. However, these catalysts are unsuitable for the preparation of short-chain polyols or of polyols having a high content of oxyethylene units, especially those having end blocks rich in oxyethylene units.

Basic catalysts which have long been known, for example those based on alkali metal hydroxides, allow problem-free preparation of short-chain polyols and/or of polyols having a high content of oxyethylene units; in that case, the catalyst generally has to be removed from the alkaline crude polymer by means of a separate workup step. The (Lewis) acid-catalyzed addition of alkylene oxides onto suitable starter compounds is of minor importance.

The base-catalyzed addition of alkylene oxides, for example ethylene oxide or propylene oxide, onto starter compounds having Zerewitinoff-active hydrogen atoms, as already mentioned, is effected in the presence of alkali metal hydroxides, but it is also possible to use alkali metal hydrides, alkali metal carboxylates or tertiary amines, for example N,N-dimethylbenzylamine or N,N-dimethylaminoethanol, or aromatic amines, for example of the imidazole type, or derivatives thereof. In the case of amine-catalyzed alkylene oxide addition reactions, it is possible to dispense with a further workup, provided that the presence of the amines in these polyols does not impair the subsequent production of polyurethane materials. However, amine catalysis allows only the preparation of polyols having comparatively low equivalent weights; see, for example, Ionescu et al. in "Advances in Urethane Science & Technology", 1998, 14, p. 151-218.

After the alkylene oxides have been added on with use of basic catalysts, for example alkali metal hydroxides, alkali metal hydrides or alkali metal carboxylates, the polymerization-active sites on the polyether chains have to be deactivated. Various procedures are possible for this purpose. For example, it is possible to neutralize with dilute mineral acids such as sulfuric acid or phosphoric acid, or with (hydroxy)carboxylic acids. Optionally, the actual neutralization step may be preceded by a hydrolysis step. The strength of the second dissociation stage of sulfuric acid is sufficient to protonate the alkali metal hydroxides formed as a result of hydrolysis of the active alkoxide groups, such that 2 mol of alkoxide groups can be neutralized per mol of sulfuric acid used. Phosphoric acid, in contrast, has to be used in an equimolar amount to the alkoxide groups to be neutralized.

In many cases, downstream polyurethane applications do not tolerate the dissolved salt content (for example after neutralization with hydroxycarboxylic acids), or the visual appearance of the cloudy polyols containing the undissolved salts which is obtained after neutralization with inorganic mineral acids is perceived to be detrimental to quality. Accordingly, the salts formed generally have to be removed. The distillation and filtration processes performable in a particularly inexpensive manner for this purpose frequently do not have good reproducibility, meaning that the salts sometimes occur in a quality of poor filterability, which can entail time-consuming and repeated filtration and recrystallization processes.

Specifically for the case of neutralization of alkaline crude polyols with inorganic acids, especially phosphoric acid, processes having reproducible formation of the salt in a quality of good filterability have been developed. For example, De Lucas et. al. in *Organic Process Research & Development* 1999, 3, p. 166-171, in the case of neutralization with phosphoric acid, are concerned with the parameters of stirrer speed, ratio of neutralization acid/alkali metal hydroxide (called the "neutralization level"), water/polyol ratio and water evaporation rate. EP 1292631 optimizes the amount of water used in the neutralization, in order to avoid caking of salt within the neutralization tank and hence also to maintain good heat transfer values over prolonged campaign durations. In this patent application, in example 2, stirring times of duration 75 min after addition of the acid to the alkaline crude polyol are specified; however, no statement is made as to the "contacting time" of acid and alkaline polyol, i.e. as to the period of time from the commencement to the conclusion of the complete addition of the acid to the crude polyol. With a comparable aim, protonatable or protonated nitrogen compounds are added as crystallization aids to neutralized polyether polyols prior to the distillative removal of water in DE 10250429. Better crystal formation and hence improved filtration characteristics are achieved in EP 1517941 by the addition of alkaline compounds during the distillation of the neutralized polyether polyol. According to the teaching of WO 9947582, low-odor polyethers are obtained by over-neutralization of alkaline crude polyethers in the presence of water of hydrolysis, followed by the neutralization of the acid excess with base after a certain stirring time. In this application too, "contact times" of 10 min up to 5 h are specified (page 5 lines 9-11, examples 1 and 2). However, these "contact times" should at best be understood as being the sum total of a "contacting time" of acid and alkaline polyol and a subsequent stirring time. It is likewise the case that no specific statement is made as to the period of time from the commencement up to the conclusion of the complete addition of the acid to the crude polyol. According to the teaching of WO 2010145899, a particular combination of neutralization level and water content prior to filtration facilitates the removal of salts and gives the polyether polyol in a simple manner with the specified acid content. According to the teaching of U.S. Pat. No. 4,507, 475, reproducible filtration results and low-odor polyethers are obtained by neutralization of the crude polyol with phosphoric acid in the presence of small amounts of water, the addition of adsorbents, and removal of salts prior to the distillative removal of water.

Against the background of the prior art, it is found, however, that there is still a need for optimization in relation to a simple and reproducible process for workup of alkaline crude polyols, especially with regard to the obtaining of non-cloudy products having low residual salt contents and the avoidance of protracted filtrations which have to be repeated in some cases.

SUMMARY

It was therefore an object of the present invention to find a simple workup process for polyols prepared under basic catalysis, which does not have the disadvantages of the prior art processes. The particular aims of the invention were a lower residual salt content and low total base contents of the polyols obtained. Furthermore, minimum filtration times are to be achieved in the removal of the neutralization salts. Polyols having low total base contents can be widely used both in "one-shot" and in prepolymer applications.

The object was achieved by a process for preparing polyols containing oxyalkylene units, comprising the following steps:
  (a) adding an alkylene oxide compound onto a starter compound having at least one Zerewitinoff-active hydrogen atom in the presence of a basic catalyst to obtain an alkaline crude polyol,
  (b) subsequently neutralizing the alkaline crude polyol by contacting an acid with the alkaline crude polyol over a period of time t1,
  (c) optionally removing water,
  (d) removing the neutralization salts formed,
wherein in step (b) a defined period of time $t1 \geq 5$ min (contacting time) is observed for the contacting of the alkaline crude polyol with the amount of acid needed for the neutralization.

DETAILED DESCRIPTION

In the context of this application, "contacting" is understood to mean the increasing of the ratio between acid and alkaline crude polyol during the combining of the two components until the target ratio of acid/crude polyol has been attained. In the simplest case, this is, for example, the phase during which the neutralization acid is added to the alkaline crude polyol. The contacting time should be understood as already described above.

The process of the invention enables simple preparation of polyols, with reproducibly good filtration results in the workup.

One embodiment of the invention is therefore also a process for workup of alkaline crude polyols which have been prepared by (a) adding an alkylene oxide compound onto a starter compound having at least one Zerewitinoff-active hydrogen atom in the presence of a basic catalyst, comprising the steps of:
  (b) neutralizing the alkaline crude polyol by contacting an acid with the alkaline crude polyol over a period of time t1,
  (c) optionally removing water,
  (d) removing the neutralization salts formed,
wherein in step (b) a defined period of time $t1 \geq 5$ min is observed for the contacting of the alkaline crude polyol with the amount of acid needed for the neutralization.

According to this procedure, products are surprisingly obtained that have low turbidity values and very low residual alkalinity (total base content) and low residual salt content. It has to be characterized as extremely surprising that, via observation of a defined contacting time of a neutralization acid with an alkaline crude polyol, firstly products having elevated purities are obtained and secondly a simple workup with short filtration times is achieved. The method is applicable to long- and short-chain polyols, and it is likewise possible to vary the structure of the polyether chains, i.e. the composition of the alkylene oxide mixture used in the preparation of the polyols. The process of the invention is of particularly good suitability for preparation of polyols containing more than 5% by weight of oxyethylene units, based on the mass of all the monomer units. More particularly, the process of the invention is suitable for preparation of polyols containing more than 5% by weight of oxyethylene units, based on the mass of all monomer units, in which the oxyethylene units are arranged in blocks, for example as an end block consisting exclusively of oxyethylene units. "Mass of all monomer units" is understood to mean the total mass of the polyol minus the mass of the starter compound(s) containing Zerewitinoff-active hydrogen atoms.

The use of the word a in connection with countable parameters should be understood here and hereinafter to mean the number one only when this is evident from the context (for example through the wording "exactly one"). Otherwise, expressions such as "an alkylene oxide", "a starter compound" or "an acid" etc. always also refer to those embodiments in which two or more alkylene oxides, two or more starter compounds, two or more acids etc. are used, possibly also as mixtures.

The invention is illustrated in detail hereinafter. Various embodiments can be combined here with one another as desired, unless the opposite is apparent to the person skilled in the art from the context.

Polyols in the context of the invention, unless specified explicitly, are understood to mean both polyether polyols and polyether ester polyols.

Starter compounds in the context of the invention are understood to mean compounds having at least one Zerewitinoff-active hydrogen atom. Hydrogen bonded to N, O or S is referred to as Zerewitinoff-active hydrogen (or as "active hydrogen") when it gives methane by reaction with methylmagnesium iodide by a process discovered by Zerewitinoff. Typical examples of compounds having Zerewitinoff-active hydrogen are compounds containing carboxyl, hydroxyl, amino, imino or thiol groups as functional groups.

According to the invention, an alkaline crude polyol is understood to mean an alkaline alkylene oxide addition product which is obtained by base-catalyzed addition of alkylene oxides and optionally further comonomers onto starter compounds having Zerewitinoff-active hydrogen atoms, before it is subjected to further workup steps.

Alkaline crude polyols that are to be worked up in an advantageous manner by the process of the invention are especially those which are obtained in the alkali metal hydroxide-, alkali metal hydride-, alkali metal alkoxide- or alkali metal carboxylate-catalyzed addition of alkylene oxides and optionally further comonomers onto starter compounds having at least one Zerewitinoff-active hydrogen atom.

Suitable starter compounds having Zerewitinoff-active hydrogen atoms usually have functionalities of 1 to 8, but in particular cases also functionalities up to 35. The molar masses thereof are generally from 17 g/mol to 1200 g/mol, preferably from 32 to 1200 g/mol, more preferably from 62 to 1200 g/mol. As well as hydroxy-functional starters, it is also possible to use starters having other functionalities, for example amino-functional starters. Examples of hydroxy-functional starter compounds are methanol, ethanol, 1-propanol, 2-propanol and higher aliphatic monools, especially fatty alcohols, phenol, alkyl-substituted phenols, propylene glycol, ethylene glycol, diethylene glycol, dipropylene glycol, butane-1,2-diol, butane-1,3-diol, butane-1,4-diol, hexanediol, pentanediol, 3-methylpentane-1,5-diol, dodecane-1,12-diol, water, glycerol, trimethylolpropane, triethanolamine, pentaerythritol, sorbitol, sucrose, hydroquinone, catechol, resorcinol, bisphenol F, bisphenol A, 1,3,5-trihydroxybenzene, methylol-containing condensates of formaldehyde and phenol or melamine or urea, and Mannich bases. Starter compounds used with preference in the process of the invention are glycerol and propylene glycol. It is also possible to use high-functionality starter compounds based on hydrogenated starch hydrolysis products. These are described, for example, in EP-A 1 525 244. Examples of starter compounds containing amino groups are ammonia, ethanolamine, diethanolamine, isopropanolamine, diisopropanolamine, ethylenediamine, hexamethylenediamine, aniline, the isomers of toluidine, the isomers of diaminotoluene, the isomers of diaminodiphenylmethane, and higher polycyclic products obtained in the condensation of aniline with formaldehyde to give diaminodiphenylmethane. In addition, starter compounds used may also be ring-opening products of cyclic carboxylic anhydrides and polyols. Examples are ring-opening products of phthalic anhydride, succinic anhydride and maleic anhydride on the one hand, and ethylene glycol, diethylene glycol, butane-1,2-diol, butane-1,3-diol, butane-1,4-diol, hexanediol, pentanediol, 3-methylpentane-1,5-diol, dodecane-1,12-diol, glycerol, trimethylolpropane, pentaerythritol or sorbitol on the other hand. Ring-opening products of this kind can also be prepared in situ directly prior to the start of the alkylene oxide addition reaction in the polymerization reactor. In addition, it is also possible to use mono- or polyfunctional carboxylic acids directly as starter compounds. It is of course also possible to use mixtures of various starter compounds.

Alkylene oxides suitable for the process of the invention are, as well as ethylene oxide, for example, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide and pinene oxide. Preference is given to using ethylene oxide (EO) and/or propylene oxide (PO) in the process of the invention. More preferably, the ratio of ethylene oxide and propylene oxide, based on the amount of alkylene oxide metered in, is between 5% by weight of ethylene oxide/95% by weight of propylene oxide and 80% by weight of ethylene oxide/20% by weight of propylene oxide. Most preferably, the ratio of ethylene oxide and propylene oxide, based on the amount of alkylene oxide metered in, is between 10% by weight of ethylene oxide/90% by weight of propylene oxide and 75% by weight of ethylene oxide/25% by weight of propylene oxide. Furthermore, in addition to the alkylene oxides, it is also possible to use other comonomers which can be metered in individually or in a mixture with the alkylene oxides. The various alkylene oxides and any other comonomers can be metered in a mixture or in blocks. Ethylene oxide can be metered in, for example, in a mixture with the other alkylene oxides or in blocks as a starting, middle or end block. Particular emphasis should be given here to the use of ethylene oxide as a pure block or to the use of blocks with a high ethylene oxide content as well as those formed from higher alkylene oxides, for example propylene oxide, since it is possible thereby to obtain not just polyurethane materials with elevated hydrophilicity but also, if the ethylene oxide has been metered in as an end block, polyether polyols having an elevated proportion of primary hydroxyl end groups, which impart elevated reactivity towards isocyanates to the polyether polyol, which can be advantageous for some applications, for example for cold-cure molded foam applications. Changes in the block composition can be undertaken during the epoxide metering phase discontinuously or else continuously, within short metering periods.

In one embodiment of the invention, comonomers used are cyclic dicarboxylic anhydrides, as described, for example, in U.S. Pat. No. 4,647,595 or GB 1108013, or lactones. The polyether ester polyols thus obtainable can in principle be subjected to the process of the invention in the same way as the polyether polyols consisting purely of oxyalkylene units. In the workup of polyols containing ester groups, however, preferable process variants are those in which prolonged contact between the alkaline polyol and water is avoided.

In the process of the invention, basic catalysts are used. Suitable basic catalysts are, for example, alkali metal hydrides, alkali metal carboxylates (for example those of monofunctional carboxylic acids), alkali metal hydroxides or alkali metal alkoxylates, for example of monofunctional alcohols. Basic catalysts used with particular preference in the process of the invention are alkali metal hydroxides (for example sodium hydroxide, potassium hydroxide or cesium hydroxide) or alkali metal alkoxylates of mono- or polyfunctional alcohols. As the latter, it is also possible to use previously prepared alkylene oxide addition products of starter compounds containing Zerewitinoff-active hydrogen atoms having alkoxylate contents of 0.05% to 50% in terms of equivalents ("polymeric alkoxylates"). The alkoxylate content of the catalyst is understood to mean the proportion of Zerewitinoff-active hydrogen atoms removed by deprotonation by a base AOH (A=alkali metal) of all the Zerewitinoff-active hydrogen atoms that were originally present in the alkylene oxide addition product of the catalyst. The amount of the polymeric alkali metal alkoxylate used is of course guided by the catalyst concentration desired for the amount of end product, expressed as the concentration of AOH. Very particular preference is given to using alkali metal hydroxides, especially potassium hydroxide, in the process of the invention. The basic catalysts are generally used in amounts, based on the mass of alkaline crude polyol, of 40 to 10 000 ppm, preferably 200 to 10 000 ppm.

The basic catalysts can be supplied to the starter compounds as pure substances (often solids) or as highly concentrated aqueous solutions. By means of a stripping step upstream of the alkylene oxide metering phase, water of dissolution and the water which arises, for example, through the reaction of the alkali metal hydroxides for use with particular preference with the Zerewitinoff-active hydrogen atoms in the starter compounds are optionally removed. If, in the case of alkali metal hydroxide catalysis, aqueous solutions of starter compounds solid at room temperature are used, it is appropriate to perform only one stripping step, i.e., for example, before commencement of the actual alkylene oxide addition phase or, less preferably, after interruption of an already running alkylene oxide addition reaction.

Preferably, the at least one starter compound is reacted with the alkylene oxide(s) at a temperature of 70 to 170° C., more preferably at a temperature of 100 to 160° C.

The reaction temperature may vary during the alkylene oxide metering phase within the above-described limits. In order to achieve an optimal balance between high alkylene oxide conversion and low by-product formation in the case of use of sensitive starter compounds (for example sucrose), it is possible first to alkoxylate at low reaction temperatures (for example at 70 to 110° C.), and only when starter conversion is sufficient, for example as soon as at least 50% by weight of the starter compounds used have reacted with alkylene oxide at at least one Zerewitinoff-active hydrogen atom, to move to higher reaction temperatures (for example to from 110 to 130° C.). Post-reactions can likewise be performed at higher temperatures (i.e. after raising the temperature to 100 to 170° C., preferably 100 to 150° C.). If long-chain polyether polyols, i.e. polyether polyols having equivalent molar masses greater than 500 Da, are prepared, it is advisable, in the case of attainment of high equivalent molar masses and in the case of metered addition of blocks having high contents of oxypropylene units, for example at 500 Da or higher equivalent molar masses, to restrict the reaction temperature to values of 120° C., preferably 110° C. or less, in order to reduce side reactions of the propylene oxide, especially the rearrangement thereof to allyl alcohol, to a tolerable degree. Equivalent molar mass is understood to mean the number-average total molar mass of the material containing active hydrogen atoms divided by the number of active hydrogen atoms (functionality). The extent of these side reactions naturally increases with the content of propylene oxide in the alkylene oxide mixture metered in; therefore, the restriction in the reaction temperature gains importance when the propylene oxide content in the alkylene oxide mixture metered in exceeds values of 30% by weight, especially when it exceeds values of 50% by weight or even 70% by weight. The metered addition of blocks having high contents of oxyethylene units or blocks consisting purely of oxyethylene units, and also post-reactions, can in turn be performed at higher temperatures (i.e. after raising the temperature to 120 to 170° C., preferably 120 to 150° C.).

It may be necessary to keep the temperature of the exothermic alkylene oxide addition reaction at the desired level by cooling. According to the prior art relating to design of polymerization reactors for exothermic reactions (for example Ullmann's Encyclopedia of Industrial Chemistry, volume B4, page 167ff., 5th edition, 1992), such cooling is generally effected via the reactor wall (e.g. jacket, half-coil pipe) and by means of further heat exchange surfaces disposed internally in the reactor and/or externally in the pumped circulation system, for example in cooling coils, cooling cartridges, or plate, shell-and-tube or mixer heat exchangers. These should advantageously be designed such that, even at the start of the metering phase, i.e. in the case of a low fill level, and in the presence of heterogeneous reactor contents (for example in the presence of solid dispersions), effective cooling is possible.

The calculated OH numbers of the alkaline polyols for workup by the process of the invention generally have values of 15 mg KOH/g to 1000 mg KOH/g, more preferably of 20 mg KOH/g to 500 mg KOH/g, most preferably of 25 mg KOH/g to 300 mg KOH/g.

The equivalent molar mass is related according to equation (1) to the OH number which can be determined by titration.

$$\text{OH number [mg KOH/g]} = 56100 \text{ [mg KOH/mol]}/\text{equivalent molar mass [g/mol]} \quad (1)$$

The progress of the reaction of the starter compounds with alkylene oxides is thus accompanied by a decrease in the OH number, according to the relationship given in equation (1).

Generally, good mixing of the reactor contents has to be ensured in all reaction phases through design and use of standard stirring units, suitable stirring units here being especially stirrers arranged over one or more levels or stirrer types which act over the full fill height (see, for example, Handbuch Apparate [Apparatus Handbook]; Vulkan-Verlag Essen, 1st ed. (1990), p. 188-208). Of particular industrial relevance here is a volume-specific mixing power which is introduced on average over the entire reactor contents and is generally in the range from 0.2 W/L to 5 W/L, based on the reactor volume, with correspondingly higher volume-specific local power inputs in the region of the stirrer units themselves and possibly in the case of relatively low fill levels. In order to achieve optimal stirring action, combinations of baffles (for example flat or tubular baffles) and cooling coils (or cooling cartridges) may be arranged within the reactor according to the general prior art, and these may also extend over the vessel base. The stirring power of the mixing unit may also be varied as a function of the fill level during the metering phase, in order to ensure a particularly high power input in critical reaction phases. For example, it may be advantageous to particularly vigorously mix solids-containing dispersions which may be present at the start of the reaction in the case of (additional) use of sucrose, or viscous starter melts. Moreover, when solid starters are used, it has to be ensured through the selection of the stirrer unit that sufficient dispersion of the solids in the reaction mixture is assured. Preference is given here to using stirrer levels passing close to the bottom, and stirrer units particularly suitable for suspension. In addition, the stirrer geometry should contribute to reducing the foaming of reaction products. The foaming of reaction mixtures can be observed, for example, after the end of the metering and post-reaction phase, when residual alkylene oxides are additionally removed under reduced pressure, at absolute pressures in the range from 1 mbar to 500 mbar. For such cases, suitable stirrer units have been found to be those which achieve continuous mixing of the liquid surface. According to the requirement, the stirrer shaft has a base bearing and optionally further support bearings in the vessel. The stirrer shaft can be driven from the top or bottom (with central or eccentric arrangement of the shaft).

Alternatively, it is also possible to achieve the necessary mixing exclusively by means of a pumped circulation system conducted through a heat exchanger, or to operate this pumped circulation system as a further mixing component in addition to the stirrer unit, in which case the reactor contents are pumped in circulation as required (typically 1 to 50 times per hour). The specific mixing energy introduced by means of pumped circulation, for example by means of an external heat exchanger or, in the case of recycling into the reactor, by means of a nozzle or injector, likewise amounts to values averaging from 0.2 to 5 W/L, this being based on the liquid volume present in the reactor and the pumped circulation system at the end of the reaction phase. It is of course also possible to achieve the necessary mixing by a combination of a stirrer unit with a pumped circulation system, for example one conducted through one or more (external) heat exchangers.

The alkylene oxides can be supplied to the reactor in different ways: one option is metered addition into the gas phase or directly into the liquid phase, for example by means of an immersed tube or a distributor ring close to the reactor base in a zone with good mixing. The continuous metered addition of the at least one alkylene oxide is effected such that the safety-related pressure limits are not exceeded. These are naturally guided by the apparatus features in the particular case, the operation being executed generally within a pressure range from 1 mbar to 10 bar, more preferably from 1 mbar to 4 bar. Especially in the case of metered addition of ethylene oxide-containing alkylene oxide mixtures or pure ethylene oxide, it should advantageously be ensured that a sufficient partial inert gas pressure is maintained within the reactor during the startup and metering phase. This can be established, for example, by means of noble gases or nitrogen. In the case of metered addition into the liquid phase, the metering units should be designed such that they self-empty, for example through provision of metering holes on the underside of the distributor ring. Generally, apparatus measures, for example the installation of non-return valves, should prevent backflow of reaction medium into the metering units and reactant reservoirs. If an alkylene oxide mixture is being metered in, the respective alkylene oxides can be supplied to the reactor separately or as a mixture. Premixing of the alkylene oxides with one another can be achieved, for example, by means of a mixing unit present in the common metering zone ("inline blending"). It has also been found to be useful to meter the alkylene oxides, on the pump pressure side, individually or in premixed form into a pumped circulation system conducted, for example, through one or more heat exchangers. In that case, for good mixing with the reaction medium, it is advantageous to integrate a high-shear mixing unit into the alkylene oxide/reaction medium stream.

Generally, a wide variety of different reactor types are suitable for the performance of the process of the invention. In general, cylindrical vessels having a height to diameter ratio of 1:1 to 10:1 are used. Useful reactor bases include hemispherical, dished, flat or conical bases.

After metered addition of epoxide has ended, or in the event of a change in the composition of the alkylene oxide mixture metered in, there may follow post-reaction phases in which residual alkylene oxide is depleted. The end of such a post-reaction phase has been attained when no further pressure drop can be detected in the reaction tank. Traces of unreacted alkylene oxides, after the (post-)reaction phase, can optionally be removed quantitatively under reduced pressure, at an absolute pressure of 1 mbar to 500 mbar, or by stripping. Stripping removes volatile constituents, for example (residual) alkylene oxides, with introduction of inert gases or steam into the liquid phase with simultaneous application of reduced pressure, for example by passing inert gas through at an absolute pressure of 5 mbar to 500 mbar.

The removal of volatile constituents, for example of unconverted alkylene oxides, either under reduced pressure or by stripping, is effected at temperatures of 20° C. to 200° C., preferably at 50° C. to 160° C., and preferably with stirring. The stripping operations can also be performed in what are called stripping columns, in which an inert gas or steam stream is passed counter to the product stream. Preference is given to performing the stripping operation with inert gases in the absence of steam.

After constant pressure has been attained, or after volatile constituents have been removed under reduced pressure and/or stripping, the alkaline crude product is subjected to the workup process of the invention. It has been found to be advantageous to handle such crude polyols here quite generally under inert gas atmosphere. Inert gases suitable for the purpose are, for example, noble gases or nitrogen; nitrogen is used particularly frequently. The prevention of ingress of oxygen very substantially prevents product discoloration; this is especially true at elevated temperatures, which are generally utilized in order to facilitate the handling of the polyether polyols in the workup steps through lowering of the viscosity. Furthermore, under an inert gas atmosphere, a much lower level of peroxide groups also arises, these contributing to cleavage of the polyether chains to form further low molecular weight oxidative degradation products, for example acetaldehyde, methanol, formic acid, formic esters, acetone and formaldehyde. Thus, reductions in quality can be avoided.

Prior to contacting with the neutralization acid in step (b) of the process of the invention, the alkaline crude polyol can first be admixed with water under hydrolysis conditions, which results in regeneration of hydroxyl groups and the corresponding metal hydroxide, as a solution in the crude polyol, from the metal alkoxide groups of the crude polyol. In the context of the invention, the term "alkaline crude polyol" therefore also encompasses the embodiment of a "hydrolyzed alkaline crude polyol". Such a hydrolysis step is generally conducted at temperatures of 80-120° C., and customary amounts of water used here are from 0.5% to 25% by weight, preferably from 1% to 20% by weight, based on the amount of alkaline crude polyol. The hydrolysis step can be effected either by mixing in the neutralization tank or by inline blending of the two components, water and crude polyol, for example during the transfer of the alkaline crude polyol from the reactor to the neutralization tank. One embodiment of the process of the invention therefore comprises a hydrolysis step between steps (a) and (b). However, such an upstream separate hydrolysis step is not essential for the performance of the process of the invention.

The actual neutralization is effected by, in step (b) of the process of the invention, contacting the alkaline crude polyol with the amount of acid needed for the neutralization over a period of time t1 of ≥5 min. In a preferred embodiment, a period of time ("contacting time") t1 of ≥5 min to ≤10 h, especially of ≥5 min to ≤6 h, is observed here. During the contacting, for example, the acid can be added to the crude polyol via a constant rate of metered addition, the rate of metered addition (amount of acid added per unit time) being constant during the contacting time. In addition is also a metering ramp where the metering rate changes (for example increases or decreases) during the contacting time. A further embodiment consists in the stepwise addition of portions of acid during the contacting time. In addition, another possibility is the combination of the forms of contacting cited. The addition of the acid to the crude polyol, in the case of variation of the addition rate or in the case of stepwise addition, should be effected in such a way that 90% of the target acid/crude polyol ratio is achieved not earlier than after 2 min, preferably not earlier than after 3 min, after commencement of the addition. The upper limit in the contacting time is generally defined by chemical engineering or economic restrictions, since an addition time of more than 10 h typically appears neither practicable nor advantageous. However, the invention is not restricted in principle to a maximum contacting time of acid and crude polyol. Typically, in one embodiment of the invention, the contacting time t1 is from 5 min to 240 min, preferably from 5 min to 180 min and more preferably from 5 min to 150 min, and most preferably from 5 min to 120 min. Typically, (i)), the optionally already hydrolyzed alkaline crude polyol is contacted with the neutralization acid by adding it to the initial charge of alkaline crude polyol in the neutralization tank over a period of ≥5 min. Alternatively, (ii)), it is also possible, for example, to initially charge a portion of the optionally already hydrolyzed crude polyol in the neutralization tank and then meter a mixture of the remaining polyol and the amount of the amount of acid needed for neutralization of the total amount of the alkaline crude polyol into the neutralization tank. Such a mixture can be made up separately in a mixing tank or else by inline blending during the transfer of the optionally already hydrolyzed residual amount of alkaline crude polyol into the neutralization tank. In the procedure according to process variant ii), it is crucial in accordance with the invention that the total time which is required for preparation of the mixture of the residual amount of the alkaline crude polyol and the neutralization acid and the metered addition of this mixture to the proportion of crude polyol already initially charged in the neutralization tank is ≥5 min. As a less preferred variant (iii)), the necessary amount of neutralization acid can also be initially charged in the neutralization tank and the optionally already hydrolyzed alkaline crude polyol can be added to the acid over a period of ≥5 min. In addition, another possibility is that (iv)) a proportion of the neutralization acid is initially charged in the neutralization tank and a mixture of residual neutralization acid and the alkaline crude polyol is then metered into the neutralization tank. Such a mixture can be made up separately in a mixing tank or else by inline blending of the residual amount of neutralization acid and the optionally already hydrolyzed alkaline crude polyol during transfer thereof into the neutralization tank. In the procedure according to process variant iv), it is crucial in accordance with the invention that the total time which is required for preparation of the mixture of the residual amount of the neutralization acid and the alkaline crude polyol and the metered addition of this mixture to the proportion of neutralization acid already initially charged in the neutralization tank is ≥5 min. In execution variants ii-iv too, it is also possible for the two components (acid and crude polyol) to be combined during the contacting, for example, with constant flow rates, meaning that the ratio between acid and crude polyol increases constantly. In addition, the two components can also be combined in such a way that the flow rate of one of the two components relative to the flow rate of the other component is increased or lowered during the contacting time. A further embodiment consists in the stepwise addition of one component to the other during the contacting time. In addition, another possibility is the combination of the forms of contacting cited. The combining of the two components, in the case of variation of the ratio of flow rates or in the case of stepwise addition, should be effected in such a way that 90% of the target acid/crude polyol ratio is achieved not earlier than after 2 min, preferably not earlier than after 3 min. Suitable acids for the process of the invention are all of those which form insoluble salts in the polyol after reaction with the alkaline crude polyols. Preference is given to using inorganic mineral acids, more preferably phosphoric acid and/or sulfuric acid. The neutralization can be conducted, for example, at temperatures of 20° C. to 150° C. Preferably, alkaline crude polyol and neutralization acid are contacted at a temperature of 60 to 140° C., most preferably at a temperature of 80 to 130° C.

After the neutralization in step (b) of the process of the invention, the polyol contains a total amount of water of 0.5% to 25% by weight, more preferably of 2% to 20% by weight, even more preferably of 3% to 17% by weight, especially preferably of 4% to 15% by weight, based on the amount of alkaline crude polyol, where the total amount of water is composed of the amount of water used for hydrolysis of the alkaline crude polyol and the amount of water present in the aqueous acid solution. During the neutralization operation, the mixture of optionally hydrolyzed crude polyol and neutralization acid that forms should be mixed by stirring and/or pumped circulation through a suitable shear unit. It is advisable to conduct the mixing in such a way that salt particles formed can form in a sufficient size for the downstream filtration step and in suitable morphology and are not prevented from doing so or destroyed again by excessive shear stress; see also De Lucas et. al. in *Organic Process Research & Development* 1999, 3, p. 166-171. Especially suitable for this purpose are stirrers are arranged on one or more levels or stirrer types that act over the whole fill height, for example what are called gate stirrers (see, for example, Handbuch Apparate; Vulkan-Verlag Essen, 1st ed. (1990), p. 188-208). The volume-specific mixing power introduced on average over the entire reactor contents in the course of mixing of acid and crude polyol and optionally in the course of removal of the water via distillation is advantageously in the range from 0.01 W/L to 2 W/L, preferably between 0.01 W/L and 1 W/L and more preferably in the range from 0.01 W/L to 0.7 W/L, based on the reactor volume. In the region of the stirrer elements, higher power inputs may be observed locally in volume-specific terms. The amount of neutralization acid needed for the neutralization of the alkaline catalyst is defined via the neutralization level. The neutralization level is understood to mean the percentage amount of neutralization equivalents added (of effective acid equivalents) based on the molar amount of alkaline catalyst to be neutralized, or on the alkoxylate content of the alkylene oxide addition product. This is to be elucidated in detail using the example of the acids $H_2SO_4$ and $H_3PO_4$ that are preferred in accordance with the invention. Since the strength of the second dissociation stage of sulfuric acid is sufficient to protonate the alkali metal hydroxides formed by hydrolysis of the active alkoxide groups, it is possible to neutralize 2 mol of alkoxide groups per mole of sulfuric acid used; in other words, 2 mol of neutralization equivalents are thus available per mole of sulfuric acid used. Thus, a neutralization level of 100% corresponds to the molar ratio of $H_2SO_4$/alkali metal catalyst=0.5. Phosphoric acid, which is weaker, by contrast, can only provide one neutralization equivalent; therefore, it has to be used in an equimolar amount to the alkoxide groups to be neutralized. Thus, in the case of phosphoric acid, a neutralization level of 100% corresponds to the equimolar ratio of $H_3PO_4$/alkali metal catalyst. Thus, it is generally the case that the following expression holds for the neutralization level in the case of neutralization of alkali metal catalysts, e.g. KOH, with an acid A which can provide n mol of neutralization equivalents per mole:

$$\text{Neutralization level}_{acid\ A} = 100 \times n \times \text{moles of [acid A]/moles of catalyst} \quad (2)$$

The neutralization levels in the case of use of sulfuric acid or phosphoric acid are consequently calculated according to equations (3) and (4):

$$\text{Neutralization level}_{sulfuric\ acid} = 200 \times \text{moles of } [H_2SO_4]/\text{moles of catalyst} \quad (3)$$

$$\text{Neutralization level}_{phosphoric\ acid} = 100 \times \text{moles of } [H_3PO_4]/\text{moles of catalyst} \quad (4)$$

In general, desired neutralization levels are between 90% and 120%; preferred neutralization levels are between 1000% and 115%; most preferred neutralization levels are between 102% and 112%.

For performance of the process of the invention, the neutralization acids, especially the inorganic mineral acids, can be used in aqueous solution. The concentration in which the aqueous acid solutions are used is generally unimportant here; it is technically possible to use concentrations between 5% by weight and 70% by weight. Preferred acid concentrations are in the range from 8% by weight to 55% by weight, more preferably from 10% by weight to 50% by weight. The acid concentration is advantageously chosen such that a sufficient metering accuracy can be achieved with the metering units available. It will be appreciated that, for compliance with a minimum contacting time t1, the mass or volume flow rate at which the acid is metered in should be matched to the acid concentration chosen. For example, for compliance with a particular minimum contacting time t1, the mass flow rate of a 20% by weight aqueous acid solution should only be half as high as the mass flow rate of a 10% by weight aqueous acid solution. The use of highly concentrated acids is inadvisable in those cases where there is a risk of damage to the substrate polyol as a result of brief existence of locally high acid concentrations, as is the case, for example, when sulfuric acid is used. The amount of acid metered in and the acid metering rate are generally monitored by using combinations of pumps and mass flow meters, for example those which work by the Coriolis principle. Pump types of particularly good suitability are, for example, magnet-coupled split cage motor pumps. For the performance of the process of the invention, it is advantageous when the neutralization in step (b) by contacting of the crude polyol with the neutralization acid over the period of time t1 is effected substantially continuously, i.e. with a substantially constant metering rate.

After the contacting of alkaline crude polyol and neutralization acid, the mixing of the two components can be further improved by stirring and/or pumped circulation over a certain period of time. In this context, as already mentioned in the preceding paragraph, the mixing should be conducted in such a way that formation and obtaining of salt particles in sufficient size and suitable morphology for the downstream salt removal step is assured. The duration of such a mixing phase is variable; it should be ascertained experimentally. Good indicators for a sufficient mixing time are a stable pH and/or a stable acid number. The temperature chosen in the course of mixing may be chosen within the same range as the neutralization temperature.

After the crude polyol neutralization has ended, a suitable juncture for additional antioxidants has also been attained. Many antioxidants, especially those having phenolic hydroxyl groups, impart an unwanted color to alkaline crude polyols; therefore, they are preferably added only after neutralization.

In most cases, the removal of salts via filtration or sedimentation is preceded by a distillation step (c). Removal of water via distillation can be accomplished in various ways. Frequently, water is removed first under standard pressure and later under reduced pressure until pressure and temperature values where the residual water content in the polyol is within the specified limits have been attained, for example with the combination of a pressure of 5 mbar and a temperature of 120° C. Such a distillation can also be interrupted for conduction of the filtration step, for example prior to entry into the reduced pressure phase. In this procedure, the fine distillation is conducted only after the filtration. The small amounts of water that remain after the standard pressure distillation are generally entirely soluble in the polyols, and so the salt at this time has already crystallized out completely. Sometimes, quantitative salt formation is even possible completely without removal of the water, for example when polyols having low equivalent molar masses are being worked up, these being entirely miscible with large amounts of water. In the workup process of the invention, it is also possible to promote salt removal via filtration through adsorbents. It is advantageous to add such adsorbents prior to or during the removal of water, since it has been found that they are particularly effective when the polyol still has a certain water content. Adsorbents suitable for this purpose are, for example, sheet silicates (bentonite, attapulgite), diatomaceous earth (Celite) or else synthetic magnesium silicate such as AMBOSOL® or Brite-Sorb®.

The removal of the salt particles is preferably effected via filtration and can be accomplished with the aid of a wide variety of different filtration apparatuses. On the industrial scale, what are called precoat filtrations are frequently conducted, in which the filtercake itself acts as the effective filter layer. In that case, the polyol containing salt particles is generally at first guided in circulation through the filtration apparatus until a filter cake having sufficient depth filter action has formed ("cloudy run time"), before the product, which then filters through as a clear liquid, is transferred into the final receiver. To promote the filtercake formation, a small amount of a filtration aid, for example cellulose fibers, can be added to the circulating polyol containing salt particles. Performance of such filtrations is frequently accomplished using what are called candle filters (e.g. FUNDA-BACs®, manufacturer: DrM), plate pressure filters (sold, for example, by SeitzSchenk®, a company in the Pall® group) or plate filters. Filtration operations can be optimized by the adjustment of process parameters, for example a suffice high pressure differential across the filter layer and a suitable viscosity controllable via the temperature. One advantage of the method of the invention is that low filtration times contribute to the efficiency of the process regime, since it features reduced cloudy run times compared to conventional methods. If filtrations are conducted on a smaller scale, it is also possible to use simple pressure suction filters equipped with a prefabricated depth filter layer. In this case, the formation of a filtercake that acts as a depth filter can be dispensed with. In this case too, it is possible by choice of an elevated polyol temperature and/or the raising of the pressure differential across the filtration layer to accelerate the filtration operation. In the simplest case, the latter can be accomplished, for example, by reducing the pressure on the filtrate side to values of less than 1 bar. It will be appreciated that the removal of the neutralization salts formed is not restricted to the option of filtration, but can be undertaken by the methods known to those skilled in the art, for example particle sedimentation, centrifugation or the like. The efficiency of sedimentation and centrifugation processes likewise profits from the good salt qualities obtainable by the process of the invention.

For salt-free and stabilized polyols which have been worked up to completion too, handling and storage with exclusion of oxygen are recommended. Inert gases suitable for this purpose are, for example, noble gases, nitrogen or carbon dioxide; noble gases or nitrogen are particularly suitable. The prevention of ingress of oxygen very substantially prevents product discoloration; this is especially true at elevated temperatures, which are generally utilized in order to facilitate the handling of the finished products through lowering of the product viscosity. Furthermore, under an inert gas atmosphere, a much lower level of peroxide groups also arises, these contributing to cleavage of the polyether chains to form further low molecular weight oxidative degradation products, for example acetaldehyde, methanol, formic acid, formic esters, acetone and formaldehyde. It is thus possible to minimize reductions in quality, lower the content of volatile organic compounds and prevent odor nuisance and impairment to health during the storage of the finished products.

The polyols worked up by the process of the invention preferably have total base contents of less than 100 ppm KOH, more preferably of less than 50 ppm KOH. The polyols prepared by the process of the invention are largely free of turbidity and have low turbidity values of preferably less than 1.5 NTU, more preferably of less than 1.0 NTU. The polyols of the invention are particularly suitable, by virtue of their advantageous properties, as starting components for the production of solid or foamed polyurethane materials and of polyurethane elastomers, since the high purity and low content of salt residues or basic catalyst residues minimizes unwanted side reactions and/or allows good controllability of the reactivities. The polyurethane materials and elastomers may also contain isocyanurate, allophanate and biuret structural units. It is likewise possible to use the polyols worked up in accordance with the invention to prepare what are called isocyanate prepolymers, the preparation of which involves using at least one (poly) isocyanate and at least one polyol obtainable by the process of the invention, the molar ratio of isocyanate groups to hydroxyl groups being greater than 1, such that the resulting prepolymers contain isocyanate groups. The isocyanate groups in the prepolymers can be reacted in one or more steps with compounds containing Zerewitinoff-active hydrogen atoms for production of the actual end products, for example solid or foamed polyurethane materials or polyurethane elastomers. Conversely, it is also possible to react (poly)isocyanates and at least one polyol worked up by the process of the invention in such a way that the molar ratio of isocyanate groups to hydroxyl groups is less than 1, and hence the resulting prepolymers contain hydroxyl groups. The hydroxyl groups in the prepolymers can be reacted in one or more steps with isocyanate-containing compounds for production of the actual end products, for example solid or foamed polyurethane materials or polyurethane elastomers.

For production of solid or foamed polyurethane materials and of polyurethane elastomers, at least one polyol worked up by the process of the invention is optionally mixed with further isocyanate-reactive components and reacted with organic polyisocyanates, optionally in the presence of blowing agents, catalysts and/or other additives, for example cell stabilizers.

EXAMPLES

Raw Materials Used
Crude Polyol (Alkaline Alkylene Oxide Addition Product) A
For the neutralization experiments, the alkaline alkylene oxide addition product of a long-chain polyether polyol was used, which was obtained by potassium hydroxide-catalyzed addition first of an inner propylene oxide block, then of an outer ethylene oxide block onto polypropylene glycol. Based on the total mass of the epoxides metered in, 87% by weight of propylene oxide as the first block and 13% by weight of ethylene oxide as the end block were metered in. The catalyst used was 4550 ppm of KOH, based on the batch size. The samples worked up by the various process variants detailed in tables 1 and 2 had an OH number of 28 mg KOH/g.
Crude Polyol (Alkaline Alkylene Oxide Addition Product) B
For the neutralization experiments, the alkaline alkylene oxide addition product of a long-chain polyether polyol was used, which was obtained by potassium hydroxide-catalyzed addition first of a short inner propylene oxide block (7.1% by weight, based on the amount of all the epoxides metered in), then of a mixed ethylene oxide/propylene oxide block (62.8% by weight of ethylene oxide; 20.1% by weight of propylene oxide, based on the total amount of all the epoxides metered in), and finally of a pure ethylene oxide block (10.0% by weight of ethylene oxide, based on the amount of all the epoxides metered in) onto glycerol. The catalyst used was 4580 ppm of KOH, based on the batch size. The samples worked up by the various process variants detailed in table 2 had an OH number of 37 mg KOH/g.
Ambosol®
Synthetically produced and precipitated, amorphous and colloidal magnesium silicate.
IRGANOX® 1076:
Octadecyl 3-(3,5-di-tert-butyl-4-hydroxyphenyl)propionate (Ciba Specialty Chemicals (now BASF))
Depth Filter.
Pall T 750 depth filter
General Description of the Working of a Polyether Polyol by Neutralization with Phosphoric Acid (Pressures Stated are Always Absolute Pressures):

A stirred glass apparatus having a connected reflux condenser and dropping funnel was initially charged with 1000 g of the crude polyol A and, after evacuation of the apparatus and reintroduction of nitrogen 3 times while stirring, heated up to a temperature of 80° C. After the required amount of distilled water to attain the total amount of water specified in table 1 had been added, neutralization was effected by adding aqueous phosphoric acid solution in the concentrations specified in table 1, with establishment of the neutralization levels reported in table 1 and compliance with the acid addition times (contacting times) specified. The water-containing neutralized crude polyol was then heated at reflux at temperatures between 103° C. and 107° C. for the heat treatment time specified and then cooled down to a temperature of 100° C. The reflux condenser was exchanged for a distillation condenser. Water was distilled off at a temperature of 100° C. over a pressure ramp over the period of time specified (distillation time); the target final pressure was 100 mbar. The pressure was then raised to atmospheric pressure by introducing nitrogen, and 0.4% by weight of Ambosol, based on the amount of crude polyol used, was added. The system was evacuated again and dewatering was continued at a temperature of 110° C. until attainment of a pressure of 20 mbar. Finally, the product was baked over a period of 3 h at a temperature of 110° C. at a pressure of 8 mbar. Thereafter, the mixture was cooled down while stirring and, during the cooling phase, based on the amount of crude polyol used, 0.046% by weight of IRGANOX 1076 was added at 90° C., followed by a stirring time of 30 min at 90° C. The product was then filtered at a temperature of 80° C. through a depth filter in an unheated pressure suction filter under 3 bar of nitrogen pressure, and the time required for the purpose (filtration time) was noted.

General Description of the Working of a Polyether Polyol by Neutralization with Sulfuric Acid (Pressures Stated are Always Absolute Pressures):

A stirred glass apparatus having a connected reflux condenser and dropping funnel was initially charged with 1000 g of the particular crude polyol (A or B) and, after evacuation of the apparatus and reintroduction of nitrogen 3 times while stirring, heated up to a temperature of 80° C. After the required amount of distilled water to attain the total amount of water specified in table 2 had been added, neutralization was effected by adding 12% by weight aqueous sulfuric acid solution, with establishment of the neutralization levels reported in table 2 and compliance with the acid addition times (contacting times) specified. The water-containing neutralized crude polyol was then heated at reflux at a temperature of 110° C. for the heat treatment time specified and then cooled down to a temperature of 100° C. The reflux condenser was exchanged for a distillation condenser. Water was distilled off at a temperature of 100° C. over a pressure ramp over the period of time specified (distillation time); the target final pressure was 100 mbar. The temperature was then raised to 110° C. and dewatering was continued until attainment of a pressure of 20 mbar. Finally, the product was baked over a period of 3 h at a temperature of 110° C. at a pressure of 8 mbar. Thereafter, the mixture was cooled down while stirring and, during the cooling phase, based on the amount of crude polyol used, 0.046% by weight of IRGANOX 1076 was added at a temperature of 90° C., followed by a stirring time of 30 min at 90° C. The product was then filtered at a temperature of 80° C. through a depth filter in an unheated pressure suction filter under 3 bar of nitrogen pressure, and the time required for the purpose (filtration time) was noted.

Test and Determination Methods:

OH Number

The OH numbers were determined by the method of DIN 53240.

Determination of Total Base Content

The determination of total base content was in accordance with the method of DIN ISO 3771, via potentiometric titration with perchloric acid in glacial acetic acid under anhydrous conditions.

Determination of Turbidity

The determination of turbidity values was in accordance with US Environmental Protection Agency Method 180.1. The unit of measurement is NTUs (nephelometric turbidity units).

Determination of Potassium Content

The potassium content was determined in accordance with DIN EN 14109 via atomic absorption spectrometry.

The results of the experiments on neutralization of the crude polyols A and B with various neutralization acids are summarized in tables 1 and 2:

TABLE 1

Neutralization experiments with phosphoric acid; all experiments were conducted with crude polyol A

| Example | Total amount of water [% by wt. based on crude polyol]* | Acid addition time ("contacting time") [min] | Neutr. level [%] | Acid concentration [% by wt. in water] | Heat treatment time at reflux temperature [min] | Distillation time at 100° C. [min] | Filtration time [min] | Total base content [ppm KOH] | Turbidity [NTU] | Potassium [ppm] |
|---|---|---|---|---|---|---|---|---|---|---|
| 1 (inv.) | 15 | 40 | 105 | 50 | 120 | 100 | 18.8 | 1 | 0.31 | 0.1 |
| 2 (inv.) | 15 | 20 | 105 | 18 | 120 | 50 | 42 | 2 | 0.334 | 0.1 |
| 3 (inv.) | 15 | 20 | 105 | 18 | 240 | 100 | 13 | 2 | 0.3 | 0.1 |
| 4 (inv.) | 10 | 21 | 105 | 18 | 240 | 100 | 10 | 2 | 0.36 | 0.1 |
| 5 (inv.) | 10 | 6 | 105 | 18 | 240 | 107 | 9 | 3 | 0.22 | 0.1 |
| 6 (inv.) | 15 | 22 | 105 | 18 | 120 | 104 | 10 | 3 | 0.4 | 0.1 |
| 7 (inv.) | 15 | 40 | 102 | 50 | 120 | 100 | 9 | 3 | 0.31 | 0.1 |
| 8 (inv.) | 15 | 40 | 107 | 18 | 120 | 100 | 14 | 3 | 0.27 | 0.1 |
| 9 (inv.) | 15 | 43 | 105 | 18 | 120 | 114 | 10 | 5 | 0.42 | 0.1 |
| 10 (inv.) | 15 | 40 | 107 | 50 | 120 | 100 | 19 | 9 | 0.69 | 4 |
| 11 (comp.) | 10 | 1 | 105 | 18 | 240 | 105 | 64 | 497 | 47.5 | 240 |
| 12 (comp.) | 10 | 1 | 105 | 18 | 120 | 115 | 50 | 703 | 79.7 | 320 |
| 13 (comp.) | 15 | 1 | 105 | 18 | 120 | 105 | 24 | 1585 | 284 | 690 |
| 14 (comp.) | 5 | 1 | 105 | 18 | 120 | 100 | 16 | 2464 | 500 | 1000 |

*Sum total amount of water of hydrolysis and the amount of water introduced via the metered addition of the acid

TABLE 2

Neutralization experiments with sulfuric acid

| Example | Crude polyol | Total amount of water [% by wt. based on crude polyol]* | Acid addition time ("contacting time") [min] | Neutr. level [%] | Heat treatment time at reflux temperature [min] | Distillation time at 100° C. [min] | Filtration time [min] | Total base content [ppm KOH] | Turbidity [NTU] | Potassium [ppm] |
|---|---|---|---|---|---|---|---|---|---|---|
| 15 (inv.) | A | 4.1 | 40 | 105 | 120 | 56 | 7.5 | 1 | 0.17 | 26 |
| 16 (inv.) | A | 4.1 | 40 | 105 | 5 | 72 | 14.5 | 5.6 | 0.63 | 68 |
| 17 (inv.) | B | 8.1 | 41 | 105 | 5 | 102 | 10 | 0 | 0.34 | 96 |
| 18 (inv.) | B | 3 | 40 | 102 | 5 | 45 | 46 | 11 | 0.64 | 45 |

*Sum total amount of water of hydrolysis and the amount of water introduced via the metered addition of the acid

The invention claimed is:

1. A process for preparing polyols containing oxyalkylene units, comprising:
   (a) adding an alkylene oxide compound onto a starter compound having at least one Zerewitinoff-active hydrogen atom in the presence of a basic catalyst to obtain an alkaline crude polyol;
   (b) subsequently neutralizing the alkaline crude polyol by contacting an inorganic mineral acid with the alkaline crude polyol over a defined period of time t1;
   (c) optionally removing water; and
   (d) removing neutralization salts formed,
   wherein in (b), when the defined period of time t1≥5 min, a contacting time, is observed for contacting the alkaline crude polyol with an amount of the inorganic mineral acid needed for the neutralization, in which the contacting means increasing a ratio between the inorganic mineral acid and the alkaline crude polyol during combining of the two components until a target ratio of acid/alkaline crude polyol has been attained; wherein (i) the inorganic mineral acid can be added to the alkaline crude polyol via a constant rate of metered addition, in which the rate of metered addition (amount of acid added per unit time) is constant during the contacting time, and/or (ii) a metering ramp is applied in which the rate of metered addition changes during the contacting time, and/or (iii) a stepwise addition of portions of the inorganic mineral acid during the contacting time is applied, in which for (ii) or (iii), the addition of the inorganic mineral acid to the alkaline crude polyol is being effected in such a way that 90% of the target ratio of acid/alkaline crude polyol is attained no earlier than 2 minutes after commencement of the addition.

2. The process for preparing polyols of claim 1, wherein the contacting time is t1≥5 min to ≤10 h.

3. The process for preparing polyols of claim 1, wherein the basic catalyst in (a) comprises at least one catalyst selected from the group consisting of alkali metal hydrides, alkali metal carboxylates, alkali metal hydroxides and alkali metal alkoxylates.

4. The process for preparing polyols of claim 1, wherein the inorganic mineral acid is in the form of an aqueous solution in a concentration of 5% to 70% by weight.

5. The process for preparing polyols of claim 1, wherein the process additionally comprises hydrolyzing the alkaline crude polyol obtained in (a) before neutralizing the alkaline crude polyol in (b).

6. The process for preparing polyols of claim 1, wherein the alkaline crude polyol after the neutralization in (b) contains a total amount of water of 0.5% to 25% by weight, based on the amount of alkaline crude polyol.

7. The process for preparing polyols of claim 1, wherein the neutralization in (b) is effected at a temperature of 20 to 150° C.

8. The process for preparing polyols of claim 1, wherein on addition of the inorganic mineral acid in (b) a neutralization level of 90% to 120% is observed.

9. The process for preparing polyols of claim 1, wherein said alkaline crude polyol contains ≥5% by weight of oxyethylene units, based on the total mass of the monomer units.

10. The process for preparing polyols of claim 1, wherein the neutralization salts formed are removed via filtration.

11. A process for workup of alkaline crude polyols which have been prepared by adding an alkylene oxide compound onto a starter compound having at least one Zerewitinoff-active hydrogen atom in the presence of a basic catalyst, comprising:
   (a) neutralizing the alkaline crude polyol by contacting an inorganic mineral acid with the alkaline crude polyol over a defined period of time t1;
   (b) optionally removing water; and
   (c) removing neutralization salts formed,
   wherein in (a), the defined period of time t1≥5 min, a contacting time, is observed for contacting the alkaline crude polyol with an amount of the inorganic mineral acid needed for the neutralization, in which contacting means increasing a ratio between the inorganic mineral acid and the alkaline crude polyol during combining of the two components until a target ratio of acid/alkaline crude polyol has been attained;
   wherein (i) the inorganic mineral acid can be added to the alkaline crude polyol via a constant rate of metered addition, in which the rate of metered addition (amount of acid added per unit time) is constant during the contacting time, and/or (ii) a metering ramp is applied in which the rate of metered addition rate changes during the contacting time, and/or (iii) a stepwise addition of portions of the inorganic mineral acid during the contacting time is applied, in which for (ii) or (iii), the addition of the inorganic mineral acid to the alkaline crude polyol is being effected in such a way that 90% of the target acid/alkaline crude polyol ratio is attained no earlier than 2 minutes after commencement of the addition.

12. The process for preparing polyols of claim 1, wherein the inorganic mineral acid comprises phosphoric acid and/or sulfuric acid.

13. The process for preparing polyols of claim 1, wherein the neutralization in (b) is effected at a temperature of 80 to 130° C.

14. The process for preparing polyols of claim 1, wherein on addition of the inorganic mineral acid in (b) a neutralization level of 102% to 112% is observed.

* * * * *